US012621393B2

(12) United States Patent
Konji

(10) Patent No.: US 12,621,393 B2
(45) Date of Patent: May 5, 2026

(54) INFORMATION PROCESSING APPARATUS PROVIDING PREDETERMINED LINK INFORMATION AND IDENTIFICATION INFORMATION, METHOD, NON-TRANSITORY COMPUTER-READABLE STORAGE MEDIUM STORING PROGRAM, AND SYSTEM

(71) Applicant: CANON KABUSHIKI KAISHA, Tokyo (JP)

(72) Inventor: Mitsuru Konji, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 269 days.

(21) Appl. No.: 18/595,713

(22) Filed: Mar. 5, 2024

(65) Prior Publication Data

US 2024/0314248 A1 Sep. 19, 2024

(30) Foreign Application Priority Data

Mar. 13, 2023 (JP) .................................. 2023-038977

(51) Int. Cl.
*H04N 1/04* (2006.01)
*G06K 15/00* (2006.01)
*H04N 1/00* (2006.01)

(52) U.S. Cl.
CPC ..... *H04N 1/00244* (2013.01); *G06K 15/4065* (2013.01); *H04N 1/00344* (2013.01)

(58) Field of Classification Search
USPC ......................................................... 358/1.15
See application file for complete search history.

(56) References Cited

U.S. PATENT DOCUMENTS

| | | | |
|---|---|---|---|
| 9,971,553 B2 | 5/2018 | Konji | |
| 2023/0156461 A1* | 5/2023 | Luo ....................... | H04W 12/06 726/1 |
| 2024/0205186 A1* | 6/2024 | Nainar ................... | H04W 12/61 |
| 2024/0380729 A1* | 11/2024 | Maki .................... | H04L 61/5092 |

FOREIGN PATENT DOCUMENTS

JP 2022-073700 A 5/2022

* cited by examiner

*Primary Examiner* — Cheukfan Lee
(74) *Attorney, Agent, or Firm* — VENABLE LLP

(57) ABSTRACT

A control method for an information processing apparatus communicable with a communication apparatus includes transmitting predetermined link information to the communication apparatus and transmitting, to a predetermined server, the predetermined link information and identification information of the communication apparatus that has been acquired from the communication apparatus and has not been randomized by a predetermined function of randomizing the identification information of the communication apparatus, based on a fact that the predetermined function is enabled in the communication apparatus. The predetermined link information transmitted to the communication apparatus is transmitted from the communication apparatus to the predetermined server.

17 Claims, 5 Drawing Sheets

F I G. 4

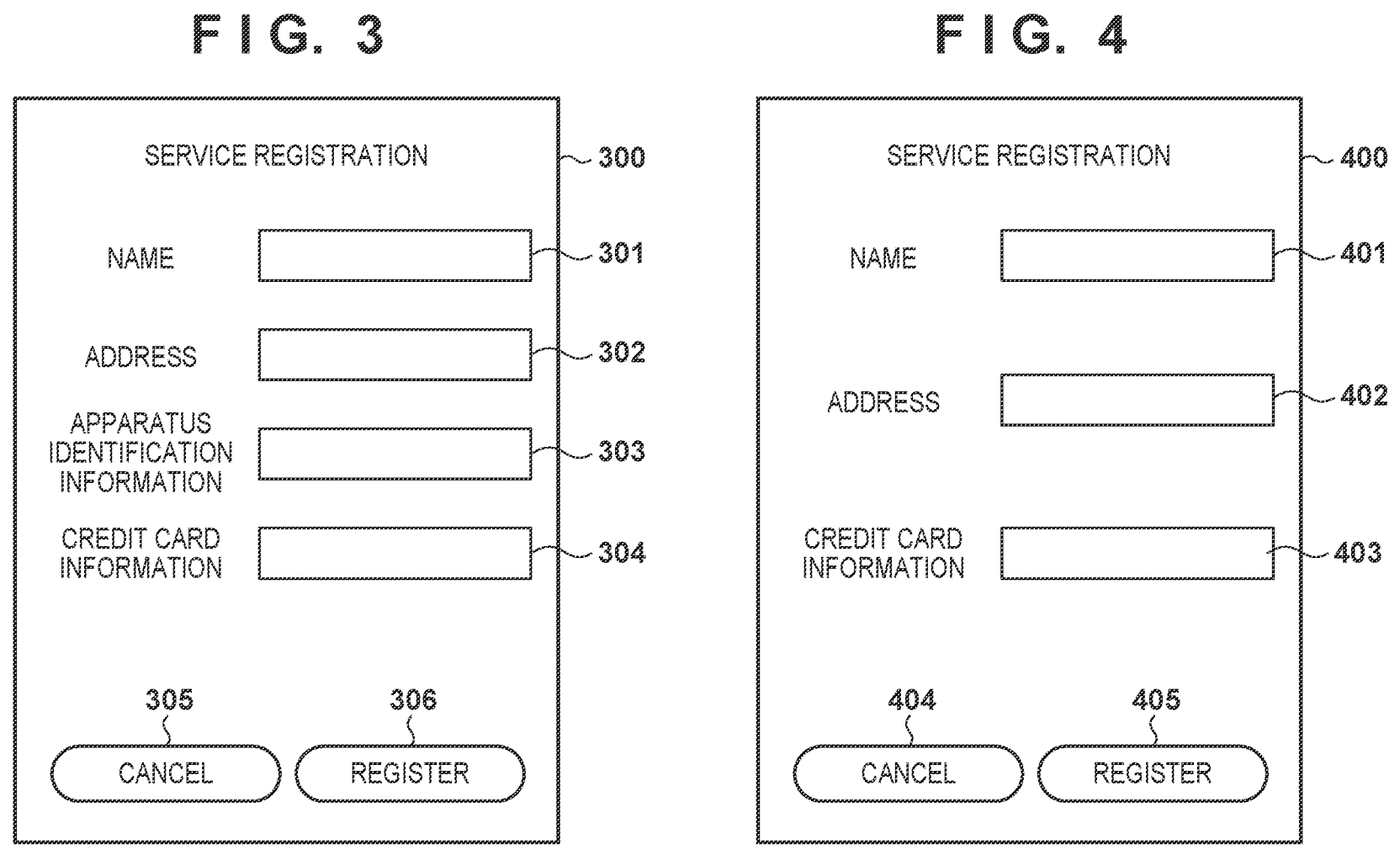

400

SERVICE REGISTRATION

401

NAME

402

ADDRESS

403

CREDIT CARD
INFORMATION

404
CANCEL

405
REGISTER

F I G. 3

300

SERVICE REGISTRATION

301

NAME

302

ADDRESS

303

APPARATUS
IDENTIFICATION
INFORMATION

304

CREDIT CARD
INFORMATION

305
CANCEL

306
REGISTER

INFORMATION PROCESSING APPARATUS PROVIDING PREDETERMINED LINK INFORMATION AND IDENTIFICATION INFORMATION, METHOD, NON-TRANSITORY COMPUTER-READABLE STORAGE MEDIUM STORING PROGRAM, AND SYSTEM

BACKGROUND OF THE INVENTION

Field of the Invention

The present invention relates to an information processing apparatus, a method, a non-transitory computer-readable storage medium storing a program, and a system.

Description of the Related Art

There is known a form in which an information processing apparatus transmits identification information of a communication apparatus to a server and thus the server recognizes/manages the communication apparatus. For example, Japanese Patent Laid-Open No. 2022-73700 describes a technique in which a communication terminal 30 transmits, to a management server 10, identification information and installation position information of an illumination device 50 in linkage with each other as information concerning the illumination device 50.

SUMMARY OF THE INVENTION

As a form in which a server acquires identification information of a communication apparatus and manages the communication apparatus becomes more widespread, a technique for causing a server to acquire identification information of a communication apparatus more appropriately is desired.

The present invention provides a mechanism for causing a server to acquire identification information of a communication apparatus more appropriately.

The present invention in one aspect provides a control method for an information processing apparatus communicable with a communication apparatus, comprising: transmitting predetermined link information to the communication apparatus and transmitting, to a predetermined server, the predetermined link information and identification information of the communication apparatus that has been acquired from the communication apparatus and has not been randomized by a predetermined function of randomizing the identification information of the communication apparatus, based on a fact that the predetermined function is enabled in the communication apparatus, wherein the predetermined link information transmitted to the communication apparatus is transmitted from the communication apparatus to the predetermined server; and transmitting, to the predetermined server, the identification information of the communication apparatus that has been acquired from the communication apparatus and has not been randomized by the predetermined function, based on a fact that the predetermined function is not enabled in the communication apparatus.

According to the present invention, it is possible to cause a server to acquire identification information of a communication apparatus more appropriately.

Further features of the present invention will become apparent from the following description of exemplary embodiments with reference to the attached drawings.

BRIEF DESCRIPTION OF THE DRAWINGS

FIG. 3 is a view showing a screen displayed by a service registration application;

FIG. 4 is a view showing a screen displayed by the service registration application;

DESCRIPTION OF THE EMBODIMENTS

Figure 1:
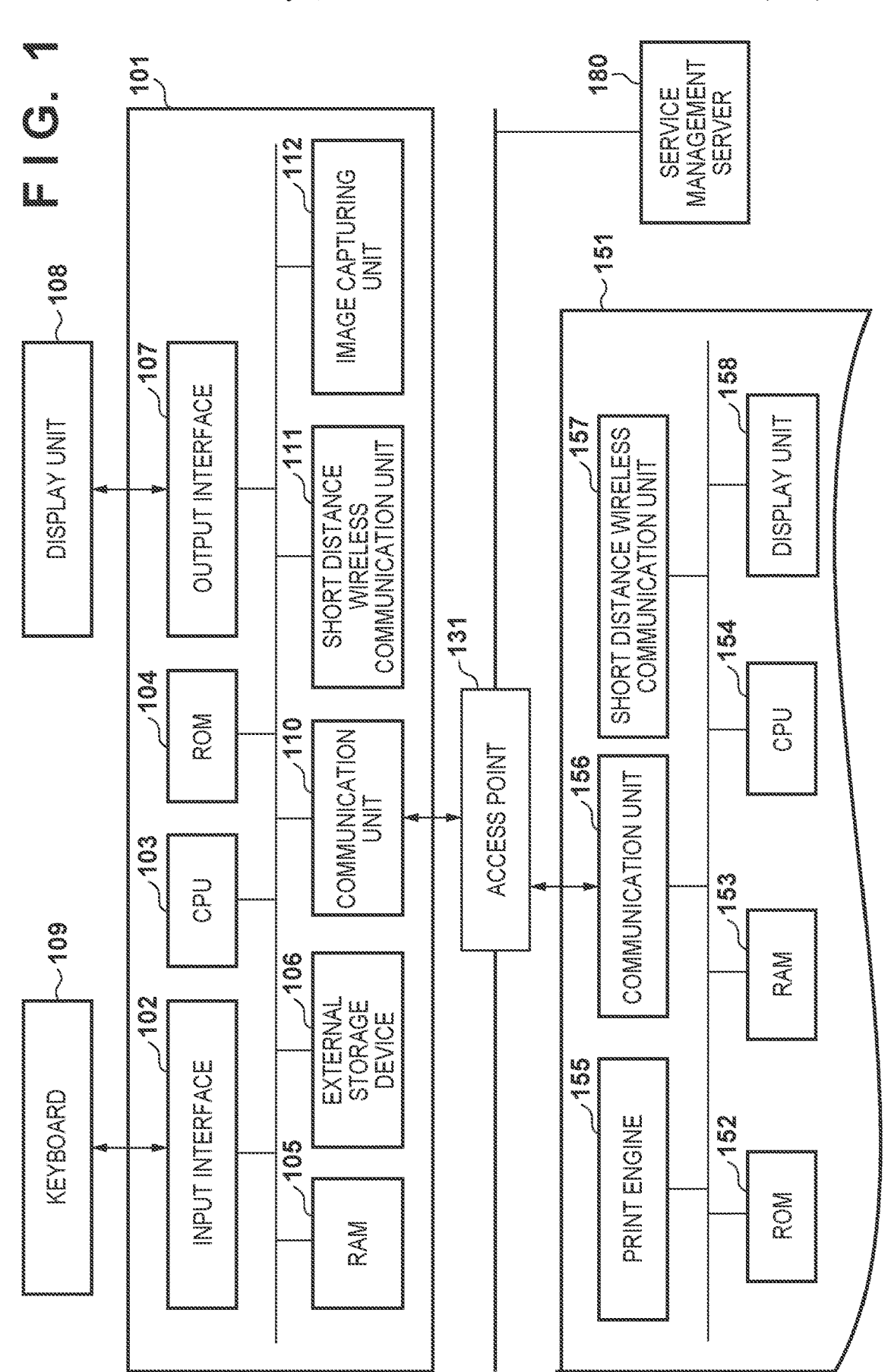
FIG. 1 is a block diagram showing the arrangement of a system including an information processing apparatus and a communication apparatus.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

First Embodiment

An information processing apparatus 101 and a communication apparatus 151 included in a communication system according to this embodiment will be described. In this embodiment, a smartphone is exemplified as the information processing apparatus 101 but the present invention is not limited to this. For example, as the information processing apparatus 101, various kinds of apparatuses such as a portable terminal, a Personal Computer (PC), a tablet terminal, a Personal Digital Assistant (PDA), and a digital camera are applicable. Furthermore, a printer is exemplified as the communication apparatus 151 but the present invention is not limited to this, and various kinds of apparatuses are applicable as long as they can perform wireless communication with the information processing apparatus 101. For example, concerning a printer, an inkjet printer, a full-color laser beam printer, a monochrome printer, and the like are applicable. Furthermore, not only a printer but also a copying machine, a facsimile apparatus, a portable terminal, a smartphone, a laptop, a tablet terminal, a PDA, a digital camera, a music playback device, a television, a smart speaker, and the like are applicable. In addition, a multi-function peripheral having a plurality of functions such as a copying function, a FAX function, and a print function is applicable.

FIG. 1 shows the information processing apparatus 101 and the communication apparatus 151. These apparatuses can communicate with a service management server 180 via an access point 131. In this embodiment, the service management server 180 is a server that can provide a paid service of the communication apparatus 151. Note that the service management server 180 may be a server system formed by a plurality of servers instead of a server system formed by only one server.

The paid service indicates a high value-added/highly functional service that is provided in return for a fee paid by a user in accordance with the service when using the communication apparatus. For example, in recent years, there is generally provided a subscription service. The subscription service is a service that can be provided by paying a fixed fee to a service provider every month. Concerning a printer as an example, when a user pays a fixed fee to a service provider, the user need not purchase ink, and ink is delivered to a place designated by the user before ink runs out. The user can freely print using the ink. For a subscription service, it is necessary to register, in a server (service management server 180) for managing the service, information such as the address of the user, a payment method of a fee, and information of a communication apparatus to receive the service (service registration). After the service registration processing, the communication apparatus or the information processing apparatus transmits the use status (the remaining amount of ink and the like) of the communication apparatus to the service management server. The service management server 180 confirms whether the user uses the communication apparatus within the scope of the service contract. If the condition is satisfied within the scope of the service contract, a service such as an ink delivery service is provided.

First, components of the information processing apparatus 101 of this embodiment and the communication apparatus 151 communicable with the information processing apparatus 101 of this embodiment will be described with reference to a block diagram shown in FIG. 1. Although this embodiment will exemplify the following components, the present invention is not limited to functions shown in FIG. 1. Components corresponding to functions executable by apparatuses that are applicable to the information processing apparatus 101 and the communication apparatus 151 are appropriately provided.

The information processing apparatus 101 includes an input interface 102, a CPU 103, a ROM 104, a RAM 105, an external storage device 106, an output interface 107, a display unit 108, a communication unit 110, a short distance wireless communication unit 111, and an image capturing unit 112. The CPU 103, the ROM 104, the RAM 105, and the like form a computer of the information processing apparatus 101 for executing a program.

The input interface 102 is an interface configured to accept data input and instruction operations from the user when an operation unit such as a keyboard 109 is operated. Note that the operation unit may include a physical keyboard and physical buttons, or may include a software keyboard and software buttons displayed on the display unit 108. That is, the input interface 102 may accept input from the user via the display unit 108.

The CPU 103 is a system control unit and controls the whole information processing apparatus 101 such as execution of an application program. To start a paid service in the communication apparatus 151, the CPU 103 executes an application program (to be referred to as a service registration application hereinafter) for transmitting, to the service management server 180, information acquired by the information processing apparatus 101 by communicating with the communication apparatus 151, individual information of the user acquired by the information processing apparatus 101, and the like. Note that the service registration application may have a function other than the registration function. For example, the service registration application may have a function of causing the communication apparatus 151 to execute printing, a function of confirming the state of the communication apparatus 151, and the like.

The ROM 104 stores permanent data such as control programs to be executed by the CPU 103, data tables, and an embedded operating system (to be referred to as an OS hereinafter) program. In this embodiment, the control programs stored in the ROM 104 perform software execution control such as scheduling, task switch, and interrupt processing under the management of the embedded OS stored in the ROM 104.

The RAM 105 is formed by a Static Random Access Memory (SRAM) or the like, which needs a backup power supply. Note that the RAM 105 can store important data such as program control variables without volatilization because the data are held by a primary battery (not shown) for data backup. In addition, a memory area for storing setting information of the information processing apparatus 101, management data of the information processing apparatus 101, and the like is also provided in the RAM 105. Furthermore, the RAM 105 is also used as the main memory and the work memory of the CPU 103.

The external storage device 106 stores the service registration application, a print information generation program that generates print information interpretable by the communication apparatus 151, and the like. The service registration application is installed from an external server (not shown) by, for example, Internet communication via the communication unit 110 to be stored in the external storage device 106. Furthermore, the external storage device 106 stores an application program (setting application) configured to execute a network setup of the communication apparatus 151, a print information generation program that generates print information interpretable by the communication apparatus 151, and the like. The setting application is an application program configured to set an access point as the connection destination of the communication apparatus 151. Note that one of the service registration application, the setting application, and a print application may be formed as an application.

The output interface 107 is an interface configured to perform control for causing the display unit 108 to display data or make a notification concerning the state of the information processing apparatus 101. The display unit 108 is formed by a Light-Emitting Diode (LED), a Liquid Crystal Display (LCD), or the like and displays data or makes a notification concerning the state of the information processing apparatus 101. The image capturing unit 112 is, for example, a camera that captures the outside.

The communication unit 110 is a component connected to the apparatus such as the communication apparatus 151 or the access point 131 to execute data communication. For example, the communication unit 110 can be connected to an access point (not shown) in the communication apparatus 151. The communication unit 110 includes, as an access point in the information processing apparatus 101, an access point for connection to the apparatus such as the communication apparatus 151. This access point is generally called tethering. Note that a communication unit 156 of the communication apparatus 151 can be connected to the access point. When the communication unit 110 enables the access point, the information processing apparatus 101 operates as the access point. When the communication unit 156 and the access point in the communication unit 110 are connected, the information processing apparatus 101 and the communication apparatus 151 can communicate with each other. If the communication unit 110 of the information processing apparatus 101 is connected to the Internet, the communication apparatus 151 can also be connected to the Internet via the information processing apparatus 101. Note that in this embodiment, it is possible to perform communication via an external apparatus existing outside the information processing apparatus 101 and the communication apparatus 151. Note that examples of the external apparatus include an external access point (the access point 131 or the like) existing outside the information processing apparatus 101 and the communication apparatus 151, and an apparatus, other than the access point, that can relay communication. For example, a device such as a wireless LAN router is used as the access point 131. The method of connecting the information processing apparatus 101 and the communication apparatus 151 via the external access point is called an infrastructure connection method.

Furthermore, in this embodiment, the communication apparatus 151 can operate in a network setup mode as a mode of executing a network setup of the communication apparatus 151 using a predetermined communication protocol (setup communication protocol) by accepting a predetermined operation from the user. If the communication apparatus 151 operates in the network setup mode, it uses the communication unit 156 to operate as a setup access point which is enabled during the operation in the network setup mode. Furthermore, assume that the SSID of the setup access point includes a predetermined character string that can be recognized by the setting application of the information processing apparatus 101. Assume also that the setup access point is an access point that does not require a password for connection. In addition, assume that the communication apparatus 151 operating in the network setup mode uses the setup communication protocol in communication with the information processing apparatus 101 connected to the setup access point. More specifically, the setup communication protocol is, for example, Simple Network Management Protocol (SNMP). If a time-out time for the network setup mode elapses after the start of the operation in the network setup mode, the communication apparatus 151 stops the operation in the network setup mode, and disables the setup access point. This is because the setup access point is an access point that does not require a password, as described above, and thus if the access point is enabled for a long time, an inappropriate apparatus highly probably requests connection. Note that the setup access point may be an access point that requires a password. In this case, a password used for connection to the setup access point is a fixed password (unchangeable by the user) that is grasped in advance by the setting application.

The short distance wireless communication unit 111 is a component wirelessly connected to the apparatus such as the communication apparatus 151 in a short distance to execute data communication, and performs communication by a communication method different from that of the communication unit 110. The short distance wireless communication unit 111 can be connected to, for example, a short distance wireless communication unit 157 in the communication apparatus 151. As the communication method, for example, Near Field Communication (NFC), Bluetooth® Classic, Bluetooth Low Energy (BLE), Wi-Fi Aware, or the like is used.

The communication apparatus 151 includes a ROM 152, a RAM 153, a CPU 154, a print engine 155, the communication unit 156, the short distance wireless communication unit 157, and a display unit 158. The ROM 152, the RAM 153, the CPU 154, and the like form a computer of the communication apparatus 151 for executing a program.

The communication unit 156 includes, as the access point in the communication apparatus 151, an access point for connection to the external apparatus such as the information processing apparatus 101. Note that the access point can be connected to the communication unit 110 of the information processing apparatus 101. When the communication unit 156 enables the access point, the communication apparatus 151 operates as the access point. Note that the communication unit 156 may directly, wirelessly be connected to the information processing apparatus 101 or may wirelessly be connected to the information processing apparatus 101 via the access point 131. The wireless communication method used by the communication unit 156 is, for example, a communication standard based on the IEEE802.11 series. The communication unit 156 may include a hardware component functioning as an access point or may operate as an access point by software for functioning as an access point. The communication unit 156 is assigned with a Media Access Control Address (MAC address). The MAC address is an identifier used to identify the communication unit, and is uniquely assigned to each communication unit in all the apparatuses including the communication apparatus and the information processing apparatus. Therefore, the MAC address is often used to identify the individual apparatus. In this embodiment, the identifier used to identify the apparatus will be referred to as apparatus identification information hereinafter. That is, the MAC address is an example of the apparatus identification information. In this embodiment, the MAC address is used as the apparatus identification information. However, the present invention is not limited to this. For example, a manufacturing number (serial number) assigned to the communication apparatus 151 may be used.

The short distance wireless communication unit 157 is a component wirelessly connected to the apparatus such as the information processing apparatus 101 in a short distance, and can be connected to, for example, the short distance wireless communication unit 111 in the information processing apparatus 101. As the communication method, for example, NFC, Bluetooth Classic, BLE, Wi-Fi Aware, or the like is used.

The RAM 153 is formed by an SRAM or the like, which needs a backup power supply. Note that the RAM 153 can store important data such as program control variables without volatilization because the data are held by a primary battery (not shown) for data backup. In addition, a memory area for storing setting information of the communication apparatus 151, management data of the communication apparatus 151, and the like is also provided in the RAM 153. Furthermore, the RAM 153 is used as the main memory and the work memory of the CPU 154, and functions as a reception buffer configured to temporarily store print information received from the information processing apparatus 101 or the like, or stores various kinds of information.

The ROM 152 stores permanent data such as control programs to be executed by the CPU 154, data tables, and an OS program. In this embodiment, the control programs stored in the ROM 152 perform software execution control such as scheduling, task switch, and interrupt processing under the management of the embedded OS stored in the ROM 152. The ROM 152 also stores the serial number for identifying the communication apparatus 151. The serial number is uniquely assigned to identify the communication apparatus 151 by the manufacturer of the communication apparatus 151. In this embodiment, the serial number can also be used as the apparatus identification information that can be used to identify the communication apparatus 151. In a case where the communication apparatus 151 is a printer, the ROM 152 also stores the use status and remaining amount of ink. The CPU 154 is a system control unit and controls the whole communication apparatus 151.

Based on information stored in the RAM 153 or a print job received from the information processing apparatus 101 or the like, the print engine 155 forms an image on a print medium such as a paper sheet by applying a printing material such as ink onto the print medium, and outputs the print result. Note that in general, the data amount of the print job transmitted from the information processing apparatus 101 or the like is large, and thus it is required to use, for communication of the print job, a communication method that allows high-speed communication. Therefore, the communication apparatus 151 receives the print job via the communication unit 156 that can perform communication at a speed higher than that of the short distance wireless communication unit 157. The display unit 158 is, for example, a panel, and displays data or makes a notification concerning the state of the communication apparatus 151.

The CPU 154 collects the use status and remaining amount of ink from the print engine 155, and stores them in the ROM 152. In a case where the information processing apparatus 101 instructs execution of service registration processing or the like or a case where the use status of the service is periodically transmitted to the service management server 180, the CPU 154 forms data in a predetermined format recognizable by the service management server 180 from the apparatus identification information and the information concerning the remaining amount of ink and the like, which are stored in the ROM 152 of the communication apparatus 151, and transmits the data to the service management server 180.

Note that a memory such as an external HDD or an SD card may be attached as an optional device to the communication apparatus 151, and information stored in the communication apparatus 151 may be stored in the memory.

An arrangement is assumed in which in order to transmit the identification information (for example, the above-described MAC address) of the communication apparatus 151 to the server, the identification information of the communication apparatus 151 is acquired by the information processing apparatus 101 as an apparatus outside the communication apparatus 151. In this case, the identification information may leak from the information processing apparatus 101 or may be used in a manner unintended by the user by a program included in the information processing apparatus 101. Note that as a technique for solving the problem, for example, there is known a technique for randomizing the identification information of the communication apparatus 151 such as the MAC address randomization technique. However, even if the server acquires the randomized identification information, the server cannot appropriately manage the communication apparatus.

To cope with this, in this embodiment, control is executed to transmit the non-randomized identification information of the communication apparatus 151 to the service management server 180 without being acquired by the information processing apparatus 101 as an apparatus outside the communication apparatus 151. This allows the service management server 180 to appropriately recognize/manage the communication apparatus 151 while suppressing the identification information of the communication apparatus 151 from leaking or from being used in a manner unintended by the user. Note that in this embodiment, as the communication apparatus 151, there exists an apparatus supporting a MAC address randomization function and an apparatus not supporting the MAC address randomization function. The MAC address randomization function is a function set by the Institute of Electrical and Electronics Engineers (IEEE), and is a function of assigning, to an apparatus, a MAC address generated in accordance with the rule set by IEEE. A MAC address generated as a random value by the MAC address randomization function will be referred to as a random MAC address hereinafter. A MAC address of a fixed value that is not randomly generated by the MAC address randomization function and is not changed will be referred to as a fixed MAC address hereinafter. Then, the apparatus supporting the MAC address randomization function is an apparatus of a newer model (model number), and the apparatus not supporting the MAC address randomization function is an apparatus of an older model.

The apparatus supporting the MAC address randomization function can execute setting of whether to enable the MAC address randomization function. Then, the communication apparatus 151 which supports the MAC address randomization function and in which the MAC address randomization function is enabled provides a random MAC address to an external apparatus. That is, the random MAC address is used as the MAC address assigned to the communication unit 156 of the communication apparatus 151. Note that if the MAC address randomization function is enabled, the MAC address assigned to the communication unit 156 of the communication apparatus 151 is periodically changed. The changed MAC address is also generated as a random value by the MAC address randomization function. The communication apparatus 151 which supports the MAC address randomization function and in which the MAC address randomization function is not enabled provides a fixed MAC address. The communication apparatus 151 which does not support the MAC address randomization function also provides a fixed MAC address to an external apparatus. That is, the fixed MAC address is used as the MAC address assigned to the communication unit 156 of the communication apparatus 151.

Note that the MAC address assigned to the communication unit 156 of the communication apparatus 151 includes information indicating the random MAC address. The MAC address is represented by alphanumeric characters indicating 12 hexadecimal digits and a delimiter such as ":" (for example, 1A:2B:3C:4D:5E:6F). The two alphanumeric characters, divided by the delimiter, of the MAC address is called an octet. A MAC address in which the second bit is 1 when the value of the first octet (in the above example, 1A) is represented in binary is defined as a random MAC address by IEEE. Note that more specifically, the MAC address in which the second bit is 1 when the value of the first octet is represented in binary is, for example, a MAC address in which the value of the first octet ends with one of values of 2, 6, A, and E. Since the random MAC address is defined as described above, the fixed MAC address is a MAC address in which the value of the first octet ends with a value other than 2, 6, A, and E.

Figure 2:
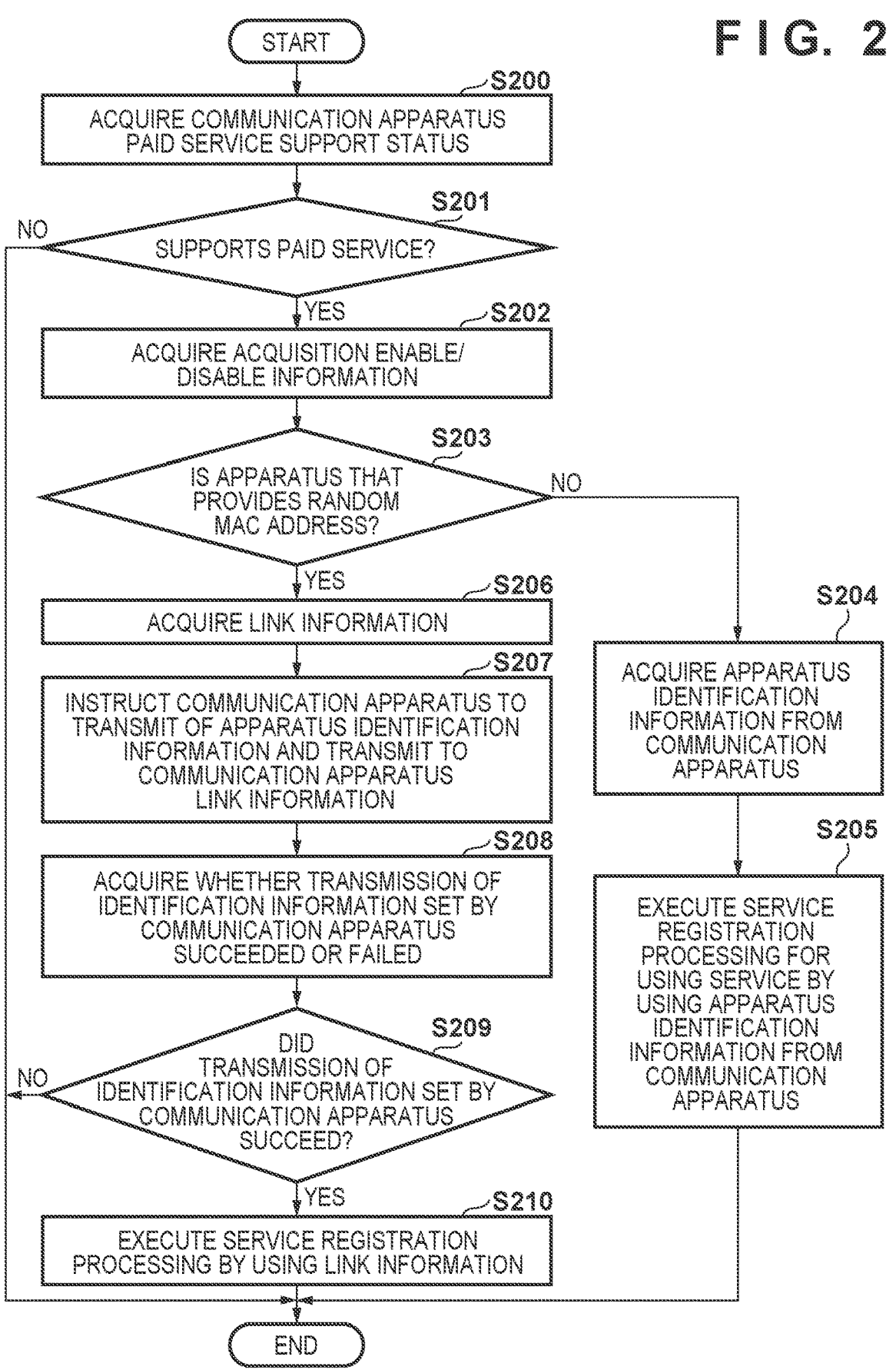
FIG. 2 is a flowchart illustrating processing executed by the information processing apparatus.

FIG. 2 is a flowchart illustrating processing executed by the information processing apparatus 101 in service registration processing according to this embodiment. The processing shown in FIG. 2 is implemented when, for example, the CPU 103 reads out the service registration application stored in the ROM 104, the external storage device 106, or the like into the RAM 105, and executes it. The processing shown in FIG. 2 is started when the service registration application is activated. However, the processing shown in FIG. 2 may be started at another timing. For example, the processing may be started when a setting operation for a network setup of the communication apparatus by the service registration application is performed or when a specific application instructs execution. Furthermore, the service registration application may be formed as a function of another application such as a print application.

In step S200, the service registration application communicates with the communication apparatus 151 to acquire information that can be used to determine whether the communication apparatus 151 is a communication apparatus in which a paid service is available. The information that can be used to determine whether the communication apparatus 151 is a communication apparatus in which a paid service is available is, for example, the product name of the communication apparatus 151.

In step S201, the service registration application determines, based on the information acquired in step S200, whether the communication apparatus 151 can support the paid service. If it is determined that the communication apparatus 151 cannot support the paid service, the processing shown in FIG. 2 ends. After the end of the processing shown in FIG. 2, subsequent communication by the paid service may be skipped. As a result, it is possible to prevent a time during which the user stands by without performing unnecessary processing from occurring. If it is determined that the communication apparatus 151 can support the paid service, the process advances to step S202. In step S202, the service registration application acquires information (to be referred to as acquisition enable/disable information) that can be used to determine whether the fixed MAC address can be acquired as the apparatus identification information from the communication apparatus 151.

The communication apparatus 151 often has low capability to display a screen, and it is difficult for the communication apparatus 151 to execute registration processing for the user to start the service. To cope with this, the information processing apparatus 101 may execute the registration processing instead. In a case of a service for the communication apparatus 151, the service management server 180 needs to grasp, for each individual communication apparatus 151, the use status of the communication apparatus 151. Therefore, at the time of service registration, it is necessary to transmit the apparatus identification information of the communication apparatus 151 to the service management server 180. However, if the information processing apparatus 101 acquires the fixed MAC address from the communication apparatus 151, a third party may specify, from the fixed MAC address, position information of the user who uses the information processing apparatus 101. For example, a case is assumed in which the communication apparatus 151 is arranged at a specific fixed place and the installation place of the communication apparatus 151 is known by a third party. The fact that the information processing apparatus 101 acquires the fixed MAC address from the communication apparatus 151 indicates that the information processing apparatus 101 exists within the communication range of the communication apparatus 151. Furthermore, since the fixed MAC address is used to specify the apparatus, and is widely used to ensure the service or the product, an apparatus other than the information processing apparatus 101 or an application other than the service registration application can readily acquire the fixed MAC address. Therefore, the fixed MAC address may illegally be used to specify the position of the user who has the information processing apparatus 101.

Thus, the communication apparatus 151 may be configured not to transmit the fixed MAC address of the communication apparatus 151 to an external apparatus. In step S202, the acquisition enable/disable information for determining whether the communication apparatus 151 is such apparatus is acquired.

When the communication apparatus 151 uses the random MAC address, it is difficult for another apparatus to uniquely specify the communication apparatus 151. That is, the anonymity of the information processing apparatus that has acquired the random MAC address is increased, thereby making it possible to protect privacy. However, while the random MAC address is used to prevent the use history of the user from being grasped, there is the demerit that the random MAC address cannot be used as the identification information of the apparatus.

Therefore, in this embodiment, in step S202, the service registration application acquires the MAC address of the communication apparatus 151 (the MAC address assigned to the communication unit 156 of the communication apparatus 151) as acquisition enable/disable information. Then, in step S203, the service registration application determines whether the communication apparatus 151 that has provided the acquisition enable/disable information to the information processing apparatus 101 is an apparatus that provides the random MAC address (an apparatus that provides no fixed MAC address). In other words, the apparatus that provides the random MAC address is an apparatus which supports the MAC address randomization function and in which the MAC address randomization function is enabled. Furthermore, in other words, this determination processing is processing of determining whether the MAC address acquired from the communication apparatus 151 is a random MAC address. As described above, the random MAC address is generated in accordance with the rule defined by IEEE. Therefore, in this embodiment, more specifically, for example, it is determined which of values of 2, 6, A, and E is a value with which the value of the first octet of the MAC address ends. Alternatively, for example, the service registration application determines whether the second bit is 1 when the value of the first octet of the MAC address is represented in binary. If YES is determined as a result of the determination processing, the process advances to step S206; otherwise, the process advances to step S204.

Although the form in which the acquisition enable/disable information is the MAC address has been described above, other information may be used. For example, the acquisition enable/disable information may be capability information indicating whether the MAC address randomization function is supported. For example, the acquisition enable/disable information may be setting information indicating whether the MAC address randomization function is enabled. After the service registration application acquires the acquisition enable/disable information in step S202, the process advances to step S203.

In step S204, the service registration application acquires the apparatus identification information of the communication apparatus 151 from the communication apparatus 151. The apparatus identification information is, for example, the MAC address. The acquired MAC address is not a random MAC address generated by the MAC address randomization function but a normal MAC address (a MAC address of a fixed value). Note that if the MAC address has already been acquired as the acquisition enable/disable information, this processing may be omitted. In step S205, the service registration application executes service registration processing using the apparatus identification information acquired from the communication apparatus 151. After that, the processing shown in FIG. 2 ends.

FIG. 3 is a view showing an example of a service registration screen 300 of the service registration application displayed on the display unit 108 via the output interface 107 of the information processing apparatus 101 in step S205. The service registration screen 300 accepts input of information or part of it to be transmitted to the service management server 180 in order to start the service. For example, practical examples of the information to be transmitted to the service management server 180 are the name of the user, the address of the user for delivery of ink and the like, the apparatus identification information of the communication apparatus 151 that receives the service, and credit card information used to withdraw the fee. On the service registration screen 300, a name input field 301, an address input field 302, an apparatus identification information input field 303, and a credit card information input field 304 are displayed. The user inputs the pieces of information to the corresponding input fields using the keyboard 109. Note that the service registration application may be configured to automatically input the apparatus identification information acquired from the communication apparatus 151 without any user operation. If the user presses a registration button 306, the input information necessary for service registration is transmitted to the service management server 180 via the communication unit 110 of the information processing apparatus 101. In this embodiment, although the apparatus identification information input field 303 is displayed, the apparatus identification information input field 303 may be set in a non-display state, and the service registration application may transmit the acquired apparatus identification information upon the pressing of the registration button 306. If a cancel button 305 is pressed, the service registration processing is aborted, and the service registration application ends. With this registration processing, it is possible to transmit, to the service management server 180, the information for linking the communication apparatus 151 with the user who uses the communication apparatus 151, thereby starting the paid service.

If it is determined in step S203 that the apparatus identification information cannot be acquired from the communication apparatus 151, the process advances to step S206. In step S206, the service registration application acquires link information instead of the apparatus identification information. The link information is information used to allow the service management server 180 to manage various kinds information in linkage with each other. In this embodiment, the link information is the identification information of the communication apparatus 151, and is a unique character string assigned to identify the communication apparatus 151 only during a given period. More specifically, the link information is a Universally Unique Identifier (UUID) generated by the OS of the information processing apparatus 101. Note that the link information is acquired every time the service registration function is executed in the information processing apparatus 101. Furthermore, upon completion of the service registration processing, the service registration application discards the acquired link information. Note that the link information may be used to execute the service registration function next time without being discarded. The UUID is a 128-bit binary number but can be represented in hexadecimal to be processed as a character string. Since the link information is not information that can be used to permanently specify the communication apparatus 151, and is shared only by a predetermined apparatus or application, the risk that the position of the user is specified, as described above, can be reduced. Note that the link information is not limited to the above-described form, and may be generated by the service registration application and acquired by the service registration application. In addition, the link information need not be the identification information of the communication apparatus 151 and may be information other than the UUID. More specifically, for example, the link information may be one-time information that is a randomly generated character string.

In step S207, the service registration application instructs, via the communication unit 110, the communication apparatus 151 to transmit the apparatus identification information to the service management server 180. Furthermore, at the time of issuing the instruction, the service registration application also transmits the link information acquired in step S206 to the communication apparatus 151, and instructs the communication apparatus 151 to transmit the link information to the service management server 180 together with the apparatus identification information. In this embodiment, the apparatus identification information and the link information are collectively referred to as an identification information set. With this arrangement, the apparatus identification information of the communication apparatus 151 can be limited to a specific transmission destination, in this example, the service management server 180. As a result, it is possible to prevent the apparatus identification information of the communication apparatus 151 from being acquired by a third party.

In step S208, the service registration application acquires information that can be used to determine whether transmission of the identification information set from the communication apparatus 151 to the service management server 180 has succeeded or failed. As will be described with reference to FIG. 5, the communication apparatus 151 transmits, to the information processing apparatus 101, information indicating the result of transmission to the service management server 180. If the information cannot be acquired for a given time, it is considered that the transmission has failed. In step S209, the service registration application determines, based on the information acquired in step S208, whether transmission of the identification information set from the communication apparatus 151 to the service management server 180 has succeeded or failed. If it is determined that the transmission has failed, the processing shown in FIG. 2 ends; otherwise, the process advances to step S210.

In step S210, the service registration application transmits information necessary for the paid service to the service management server 180 using the link information.

FIG. 4 is a view showing an example of a service registration screen 400 of the service registration application displayed on the display unit 108 via the output interface 107 of the information processing apparatus 101 in step S210. The service registration screen 400 accepts input of information or part of it to be transmitted to the service management server 180 in order to start the service. A name input field 401, an address input field 402, and a credit card information input field 403 are displayed, and the user inputs user information to the fields using the keyboard 109. If the user presses a registration button 405, the input information necessary for service registration is transmitted to the service management server 180 via the communication unit 110 of the information processing apparatus 101. When transmitting the information, the service registration application also transmits the link information acquired in step S206. This can link, via the link information, the apparatus identification information, which the communication apparatus 151 is instructed to transmit, with the information necessary for service registration, which is transmitted in this processing. Then, when the use status of the communication apparatus 151 is transmitted from the communication apparatus 151 to the service management server 180, the service management server 180 can manage the charge and delivery to the user.

Figure 5:
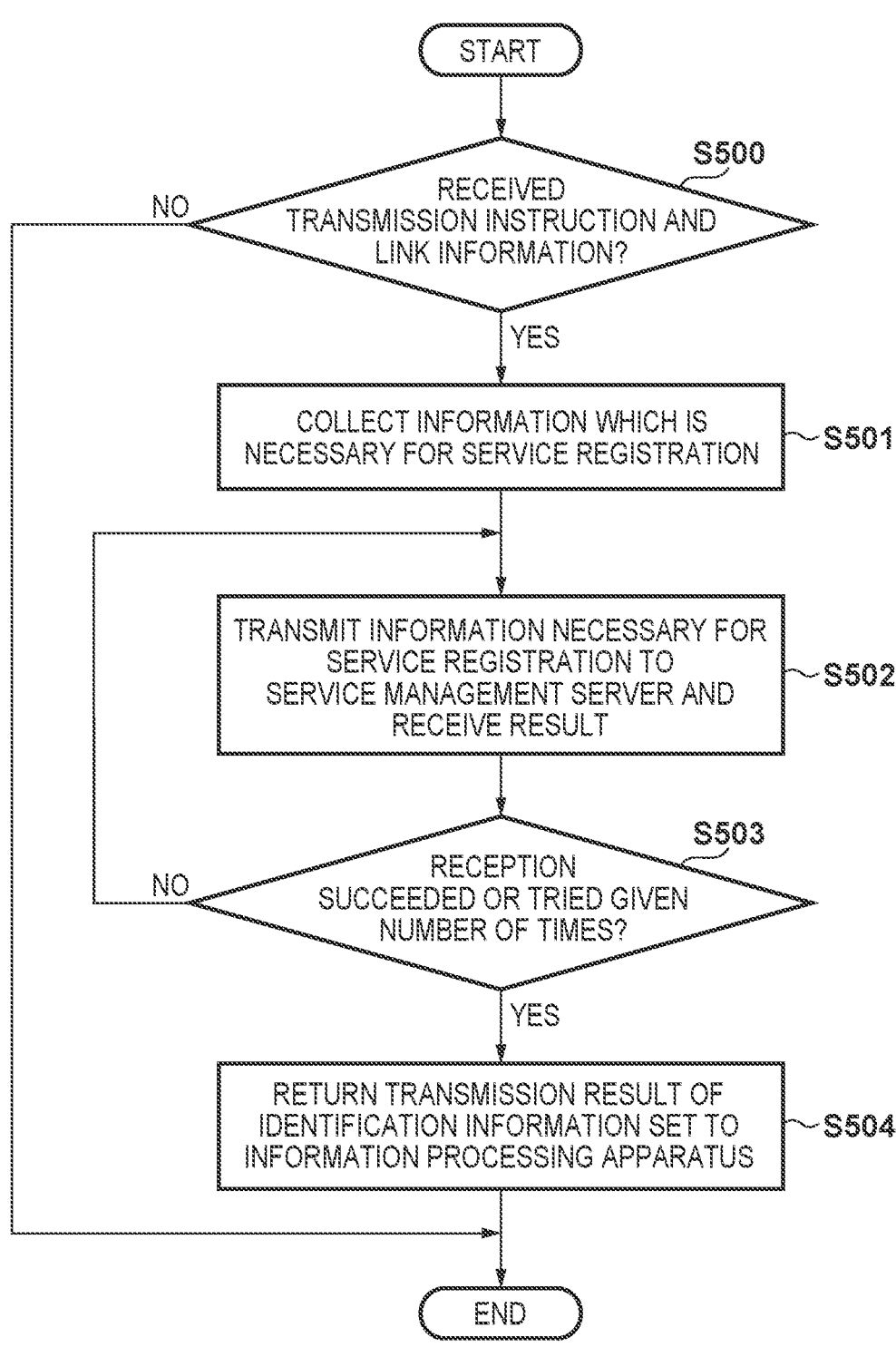
FIG. 5 is a flowchart illustrating processing executed by the communication apparatus.

FIG. 5 is a flowchart illustrating processing of transmitting service registration information of the communication apparatus 151 according to this embodiment. The processing shown in FIG. 5 is implemented when, for example, the CPU 154 reads out a program stored in the ROM 152 and executes it.

In step S500, the CPU 154 determines whether the link information and the instruction transmitted from the service registration application of the information processing apparatus 101 in step S207 have been received. If it is determined that the instruction and the information have been received, the process advances to step S501; otherwise, the processing shown in FIG. 5 ends.

In step S501, the CPU 154 collects information necessary for service registration. The information necessary for service registration is, for example, the apparatus identification information such as the MAC address of the communication apparatus 151. Furthermore, the information necessary for service registration includes the link information that has been acquired by the service registration application and transmitted to the communication apparatus 151 in step S207. Furthermore, the information necessary for service registration may include other information, and may include an ink model number used for printing in a case where the communication apparatus 151 is a printer. This is because service contents, for example, ink to be delivered as an alternative when ink runs out is different depending on the ink model number. In this embodiment, the communication apparatus 151 is configured not to return the apparatus identification information or to return information that is not the apparatus identification information even if another apparatus requests the apparatus identification information. That is, the communication apparatus 151 is configured to transmit the apparatus identification information only to a specific partner. The information that is not the apparatus identification information is, for example, the random MAC address. That is, the communication apparatus 151 can transmit the MAC address only to the service management server 180, and is configured to return the random MAC address even if another apparatus requests the apparatus identification information.

In step S502, the CPU 154 transmits the information necessary for service registration, which has been collected in step S502, to the service management server 180 via the communication unit 156 of the communication apparatus 151. Upon receiving the information necessary for service registration, the service management server 180 transmits an information reception result indicating success of reception to the communication apparatus 151. In step S503, the CPU 154 communicates with the service management server 180 until it receives the information reception result from the service management server 180. If a success result cannot be acquired even after a retry is made a predetermined number of times, or the information reception result indicating success can be acquired, the process advances to step S504.

In step S504, if the information reception result acquired from the service management server 180 in step S502 indicates success, the CPU 154 transmits, to the information processing apparatus 101, information indicating success of transmission of the identification information set. On the other hand, if the information reception result acquired from the service management server 180 in step S502 indicates a failure, the CPU 154 transmits, to the information processing apparatus 101, information indicating a failure of transmission of the identification information set.

In this embodiment, the apparatus identification information transmission instruction has been explained but the present invention is not limited to this. For example, if the function of the apparatus cannot be used at all unless the communication apparatus 151 registers the paid service, it is essential for the apparatus to perform service registration. In a case of a service using a server, the Internet environment is essential for the communication apparatus 151. Therefore, a setup of a network that can use the Internet is executed. If the setup succeeds, this may be used as a trigger for causing the communication apparatus 151 to transmit the apparatus identification information.

Figure 6:
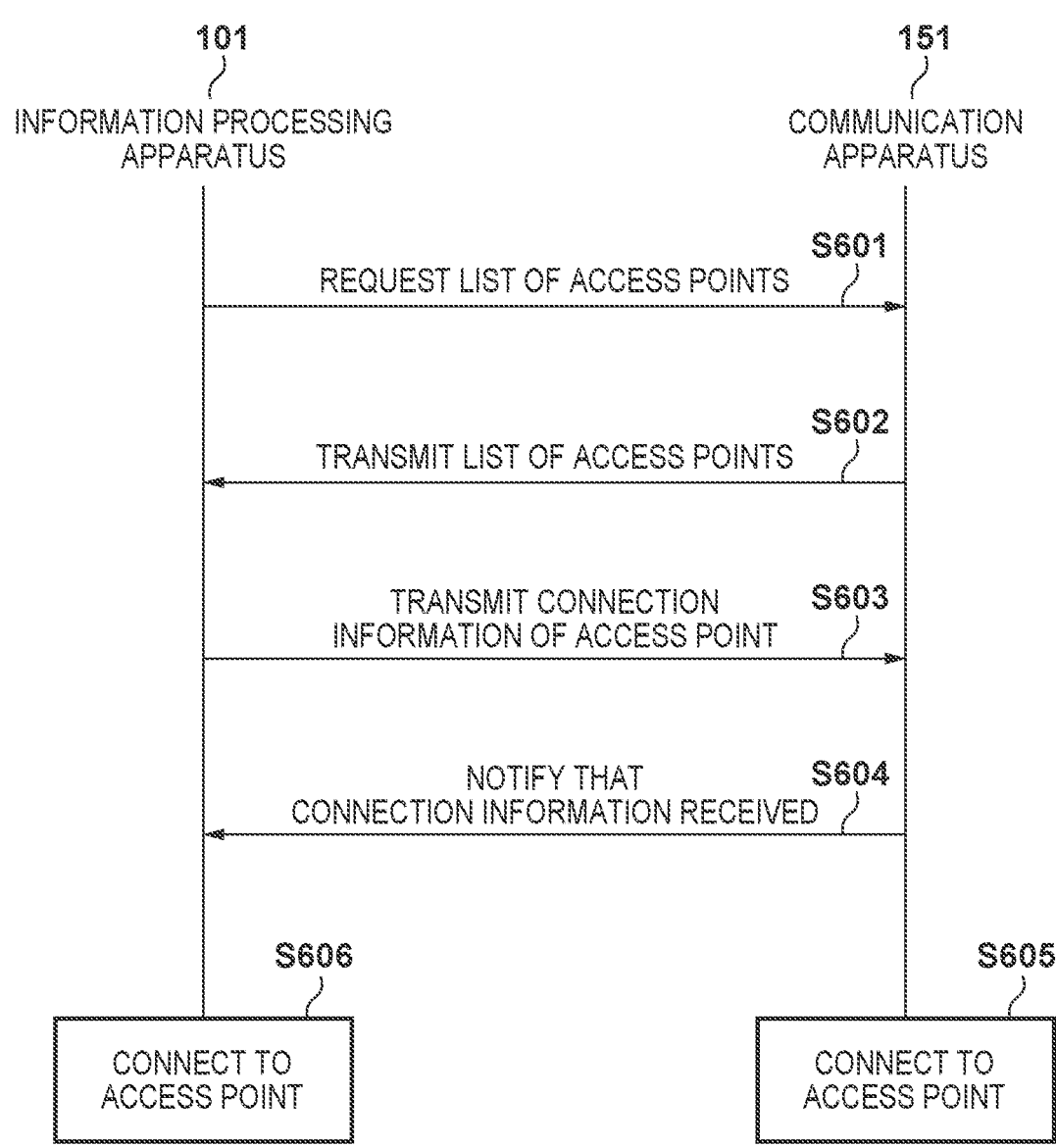
FIG. 6 is a sequence chart showing network setup processing.

An example of the procedure of the network setup processing performed between the information processing apparatus 101 and the communication apparatus 151 will be described below with reference to FIG. 6. The procedure shown in FIG. 6 is implemented when, for example, the CPU of each apparatus reads out a program stored in the ROM of each apparatus, the external storage device, or the like into the RAM of each apparatus, and executes it. Note that as described above, in communication via Wi-Fi connection between the information processing apparatus 101 and the communication apparatus 151 operating in the network setup mode, the setup communication protocol is used.

In S601, the setting application causes the information processing apparatus 101 to request, of the communication apparatus 151, a list of access points via Wi-Fi connection between the information processing apparatus 101 and the communication apparatus 151 operating in the network setup mode.

In S602, the communication apparatus 151 transmits the list of the access points to the information processing apparatus 101 via the Wi-Fi connection between the information processing apparatus 101 and the communication apparatus 151 operating in the network setup mode. Note that the list transmitted here is a list of one or a plurality of access points connectable to the communication apparatus 151, which are found by executing an AP search by the communication apparatus 151.

In S603, the information processing apparatus 101 transmits connection information of one of the access points included in the received list to the communication apparatus 151 via the Wi-Fi connection between the information processing apparatus 101 and the communication apparatus 151 operating in the network setup mode. Note that this processing is implemented when the setting application controls the information processing apparatus 101 to transmit connection information of one of the access points included in the received list. In this processing, more specifically, if the received list includes a connected AP, the information processing apparatus 101 transmits connection information of the connected AP. Alternatively, if the received list includes no connected AP, the information processing apparatus 101 displays the received list, and accepts, from the user, selection of one of the access points from the list. Then, the information processing apparatus 101 transmits connection information of the selected access point. Note that before the connection information is transmitted, the information processing apparatus 101 accepts input of a password for connection to the access point from the user on a screen displayed by the setting application. Then, the accepted password is included in the connection information, and the connection information is transmitted.

In S604, the communication apparatus 151 notifies, via the Wi-Fi connection between the information processing apparatus 101 and the communication apparatus 151 operating in the network setup mode, the information processing apparatus 101 that the connection information has been received.

In S605, the communication apparatus 151 ends the network setup mode, and shifts to the infrastructure mode. Then, the communication apparatus 151 attempts to perform connection to the access point corresponding to the connection information using the connection information acquired in S603. If connection succeeds, the communication apparatus 151 can execute communication via a network formed by the connected access point.

In S606, using the stored connection information, the setting application causes the information processing apparatus 101 to be reconnected to the access point to which the information processing apparatus 101 was connected at the time of execution of the setting operation. Note that the present invention is not limited to this. For example, in a case where connection information of another access point different from the access point to which the information processing apparatus 101 was connected by Wi-Fi at the time of execution of the setting operation is transmitted to the communication apparatus 151, the information processing apparatus 101 may be connected to the other access point.

After that, the setting application causes the information processing apparatus 101 to search for the communication apparatus 151 on the network to which the self-apparatus belongs. Then, if the communication apparatus 151 is found, the information processing apparatus 101 requests capability information of the communication apparatus 151, and the communication apparatus 151 transmits the capability information to the information processing apparatus 101. This registers information of the communication apparatus 151 in the setting application, and then the setting application allows communication with the communication apparatus 151 to be executed. More specifically, for example, the setting application allows a print job to be transmitted to the communication apparatus 151. Note that at this time, if the information processing apparatus 101 belongs to the network formed by the access point to which the communication apparatus 151 is connected by the network setup, it is possible to execute communication with the communication apparatus 151 via the access point. Note that communication at this time is executed using, for example, a communication protocol (more specifically, for example, CHMP) different from the setup communication protocol.

In this embodiment, the UUID of the OS of the information processing apparatus 101 has been explained as link information. However, the present invention is not limited to this. With respect to the UUID, number collision that the service registration application of another information processing apparatus issues the same UUID at the same timing occurs with extremely low probability. If number collision occurs, the service management server 180 cannot uniquely link the user with the communication apparatus 151. Therefore, link information may be generated by another method. For example, the information processing apparatus 101 may acquire the link information from the service management server 180 via the communication apparatus 151 or acquire the link information from the service management server 180 by directly communicating with the service management server 180. The service management server 180 generates link information not to cause collision, and transfers the link information to each apparatus as the acquisition request source, thereby making it possible to perform management not to cause the above-described number collision.

As described above, according to this embodiment, by transmitting the apparatus identification information of the communication apparatus 151 only to a specific communication destination, it is possible to prevent the apparatus identification information from being acquired by another apparatus such as the information processing apparatus 101.

Note that the form in which information that can be used as the identification information of the communication apparatus 151, can randomly be generated by the randomization function, and can periodically be changed is the MAC address has been explained above. However, the present invention is not limited to this. For example, this information may be information such as a serial number or an SSID.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-038977, filed Mar. 13, 2023, which is hereby incorporated by reference herein in its entirety.

What is claimed is:

1. A control method for an information processing apparatus communicable with a communication apparatus, comprising:

transmitting predetermined link information to the communication apparatus and transmitting, to a predetermined server, the predetermined link information and identification information of the communication apparatus that has been acquired from the communication apparatus and has not been randomized by a predetermined function of randomizing the identification information of the communication apparatus, based on a fact that the predetermined function is enabled in the communication apparatus, wherein the predetermined link information transmitted to the communication apparatus is transmitted from the communication apparatus to the predetermined server; and transmitting, to the predetermined server, the identification information of the communication apparatus that has been acquired from the communication apparatus and has not been randomized by the predetermined function, based on a fact that the predetermined function is not enabled in the communication apparatus.

2. The method according to claim 1, wherein in a case where the predetermined function is not enabled in the communication apparatus, the predetermined link information is not transmitted to the communication apparatus and the predetermined server.

3. The method according to claim 1, further comprising acquiring predetermined information from the communication apparatus, wherein based on a fact that the predetermined information acquired from the communication apparatus corresponds to enabling of the predetermined function in the communication apparatus, the predetermined link information is transmitted to the communication apparatus and the predetermined link information and the identification information of the communication apparatus that has been acquired from the communication apparatus and has not been randomized by the predetermined function are transmitted to the predetermined server, and based on a fact that the predetermined information acquired from the communication apparatus does not correspond to enabling of the predetermined function in the communication apparatus, the identification information of the communication apparatus that has been acquired from the communication apparatus and has not been randomized by the predetermined function is transmitted to the predetermined server.

4. The method according to claim 1, wherein the identification information of the communication apparatus is a MAC address.

5. The method according to claim 1, wherein the predetermined function is a MAC address randomization function.

6. The method according to claim 1, wherein the predetermined link information is a Universally Unique Identifier (UUID).

7. The method according to claim 1, wherein the predetermined link information is one-time information that is a randomly generated character string.

8. The method according to claim 1, wherein after the predetermined link information transmitted to the communication apparatus is transmitted from the communication apparatus to the predetermined server, the communication apparatus is registered in a predetermined service managed by the predetermined server.

9. The method according to claim 8, wherein the predetermined service is a subscription service.

10. The method according to claim 9, wherein the predetermined service is an ink subscription service.

11. The method according to claim 8, further comprising determining whether the communication apparatus supports the predetermined service, wherein in a case where it is determined that the communication apparatus supports the predetermined service, based on the fact that the predetermined function is enabled in the communication apparatus, the predetermined link information is transmitted to the communication apparatus and the predetermined link information and the identification information of the communication apparatus that has been acquired from the communication apparatus and has not been randomized by the predetermined function are transmitted to the predetermined server, in a case where it is determined that the communication apparatus supports the predetermined service, based on the fact that the predetermined function is not enabled in the communication apparatus, the identification information of the communication apparatus that has been acquired from the communication apparatus and has not been randomized by the predetermined function is transmitted to the predetermined server, and in a case where it is not determined that the communication apparatus supports the predetermined service, the identification information of the communication apparatus is not transmitted to the predetermined server.

12. The method according to claim 11, wherein in a case where it is not determined that the communication apparatus supports the predetermined service, the predetermined link information is not transmitted to the communication apparatus and the predetermined server.

13. The method according to claim 1, wherein the communication apparatus is a printer.

14. The method according to claim 1, further comprising:

determining whether transmission, from the communication apparatus to the predetermined server, of the predetermined link information transmitted to the communication apparatus has succeeded; and transmitting, in a case where it is determined that the transmission has succeeded, information concerning registration in a predetermined service managed by the predetermined server to the predetermined server, and not transmitting, in a case where it is not determined that the transmission has succeeded, the information concerning registration in the predetermined service managed by the predetermined server to the predetermined server.

15. The method according to claim 14, further comprising acquiring, from the communication apparatus, information used to determine whether the transmission has succeeded.

16. An information processing apparatus communicable with a communication apparatus, comprising at least one memory and at least one processor which function to:

transmit predetermined link information to the communication apparatus and transmit, to a predetermined server, the predetermined link information and identification information of the communication apparatus that has been acquired from the communication apparatus and has not been randomized by a predetermined function of randomizing the identification information of the communication apparatus, based on a fact that the predetermined function is enabled in the communication apparatus, wherein the predetermined link information transmitted to the communication apparatus is transmitted from the communication apparatus to the predetermined server; and transmit, to the predetermined server, the identification information of the communication apparatus that has been acquired from the communication apparatus and has not been randomized by the predetermined function, based on a fact that the predetermined function is not enabled in the communication apparatus.

17. A non-transitory computer-readable storage medium storing a program configured to cause a computer to function to:

transmit predetermined link information to a communication apparatus and transmit, to a predetermined server, the predetermined link information and identification information of the communication apparatus that has been acquired from the communication apparatus and has not been randomized by a predetermined function of randomizing the identification information of the communication apparatus, based on a fact that the predetermined function is enabled in the communication apparatus, wherein the predetermined link information transmitted to the communication apparatus is transmitted from the communication apparatus to the predetermined server; and transmit, to the predetermined server, the identification information of the communication apparatus that has been acquired from the communication apparatus and has not been randomized by the predetermined function, based on a fact that the predetermined function is not enabled in the communication apparatus.

\*    \*    \*    \*    \*